United States Patent
Kochi et al.

(10) Patent No.: US 6,906,913 B2
(45) Date of Patent: Jun. 14, 2005

(54) SOLID ELECTROLYTIC CAPACITOR AND MANUFACTURING METHOD THEREOF

(75) Inventors: Ayumi Kochi, Moriguchi (JP); Seiji Takagi, Neyagawa (JP); Yuji Mido, Higashiosaka (JP); Yasuo Kanemitsu, Kyoto (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/416,310

(22) PCT Filed: Oct. 17, 2002

(86) PCT No.: PCT/JP02/10792

§ 371 (c)(1),
(2), (4) Date: Jun. 10, 2003

(87) PCT Pub. No.: WO03/034453

PCT Pub. Date: Apr. 24, 2003

(65) Prior Publication Data
US 2004/0160729 A1 Aug. 19, 2004

(30) Foreign Application Priority Data
Oct. 18, 2001 (JP) ........................................ 2001-320168

(51) Int. Cl.$^7$ .......................... H01G 9/042; H01G 4/228
(52) U.S. Cl. ........................ 361/529; 361/533; 29/29.03
(58) Field of Search ................................. 361/523–541; 29/25.03

(56) References Cited

U.S. PATENT DOCUMENTS 5,223,120 A * 6/1993 Kojima et al. ............... 205/317
6,400,556 B1 * 6/2002 Masuda et al. .............. 361/523

FOREIGN PATENT DOCUMENTS

| JP | 58-115809 | 7/1983 |
| JP | 2000-243665 | 9/2000 |
| JP | 2001-085273 | 3/2001 |

* cited by examiner

Primary Examiner—Eric Thomas
(74) Attorney, Agent, or Firm—Parkhurst & Wendel, L.L.P.

(57) ABSTRACT

A solid electrolytic capacitor having excellent electrical characteristics due to an insulating protective layer. A water-shedding silicone rubber that cures by moisture or heat energy is coated to form the insulating protective layer on a protruding portion of a valve metal foil, at a protruding portion on the end surface of a porous valve metal body and on the surface of a dielectric layer covering the protruding portion of the valve metal foil.

9 Claims, 5 Drawing Sheets

US 6,906,913 B2

SOLID ELECTROLYTIC CAPACITOR AND MANUFACTURING METHOD THEREOF

TECHNICAL FIELD

The present invention relates to solid electrolytic capacitors used for electric circuitry in electric or electronic equipment and manufacturing methods thereof.

BACKGROUND ART

FIG. 6 shows a structure of a conventional solid electrolytic capacitor. Next a manufacturing method of such solid electrolytic capacitor is described. Dielectric layer 13 is formed on porous valve metal 12 provided on a surface of valve metal foil 11. A conductive polymer layer is applied on dielectric layer 13 to form solid electrolyte layer 14, on which collector layer is formed consisting of carbon layer 15 and silver paste layer 16. The capacitor is then resin packaged to form outer package 17. External terminal 18 electrically connected to valve metal foil 11 is provided at the first end of outer package 17 and external terminal 19 electrically connected to collector layer is provided at the second end of outer package 17.

In such solid electrolytic capacitor, undesired solid electrolyte erroneously applied on protruding potion 11A of valve metal foil 11 during formation of solid electrolyte layer 14 causes electrical short-circuit or increases leakage current in capacitor. Insulating resinous protective layer 20 is generally provided on protruding potion 11A to prevent such a trouble.

Typically, coated and cured insulating resin such as epoxy resin or silicone resin, or insulating adhesive tape made of polyimide resin used as a base material serves as insulating protective layer 20. However, undesired solid electrolyte also is usually formed on the insulating resin or the insulating tape. This undesired solid electrolyte must be cleared by laser processing, but the processing may cause increase in leakage current. In addition, coated insulating resin partially permeates porous valve metal 12, which may impair capacitor characteristics due to, for example, uncontrollability of capacitance. In addition, the coating method lacks in workability and mass productivity.

DISCLOSURE OF THE INVENTION

The present invention provides a solid electrolytic capacitor showing excellent electrical characteristics due to an insulating protective layer. The insulating protective layer composed of silicone rubber that cures by moisture or heat energy is provided such that the layer wraps around protruding potion of valve metal foil.

The manufacturing method of afore-mentioned solid electrolytic capacitor includes the steps of:

(a) providing a porous valve metal body at least on one surface of valve metal foil which has a protruding portion in one end but leaving the protruding portion excepted, (b) forming an insulating protective layer composed of silicone rubber which cures by moisture or heating such that the coated layer wraps around the protruding potion of the valve metal, (c) forming a dielectric layer at least on a surface of the porous valve metal body, (d) forming a solid electrolyte layer on the dielectric layer, and (e) forming a collector layer on the solid electrolyte layer.

DETAILED DESCRIPTIONS OF THE INVENTION

The exemplary embodiments of this invention are described with reference to the drawings. The similar elements consisting the same configuration have the same reference marks and the detailed description is omitted.

(Exemplary Embodiment 1)

Figure 1:
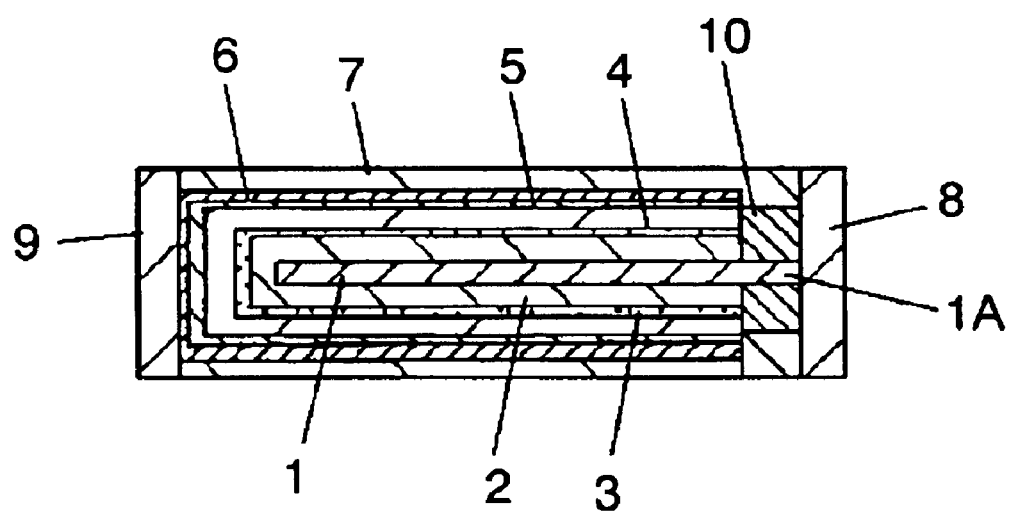
FIG. 1 illustrates a cross-sectional view showing a solid electrolytic capacitor according to exemplary embodiment 1 of the present invention.
Figure 2A:
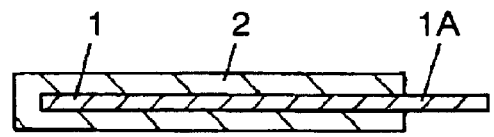
FIGS. 2A to 2F illustrate schematic views showing manufacturing processes of the solid electrolytic capacitor according to exemplary embodiment 1 of the present invention.
Figure 2B:
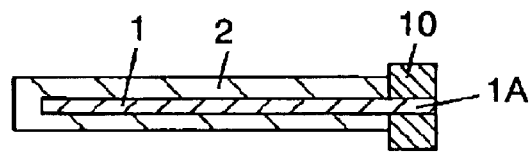
Figure 2C:
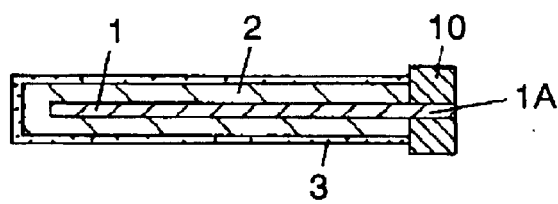
Figure 2D:
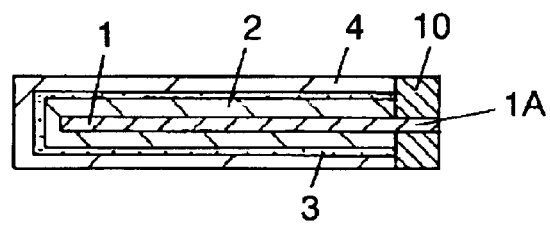
Figure 2E:
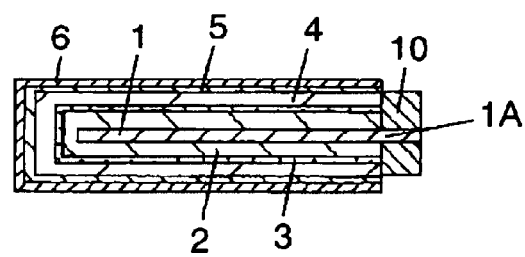
Figure 2F:
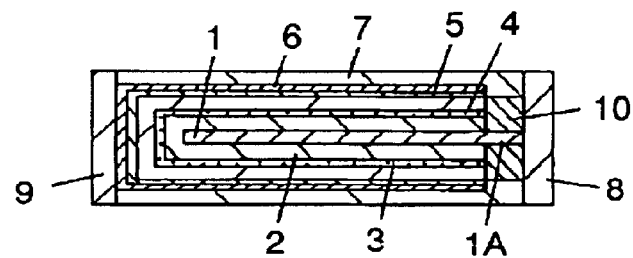

The configuration of a solid electrolytic capacitor according to exemplary embodiment 1 of this invention is described with reference to FIG. 1.

Porous valve metal body 2 (hereafter referred to as "porous body") is formed on valve metal foil 1 (hereafter referred to as metal foil). Insulating protective layer 10 composed of silicone rubber which cures by moisture or heat energy is provided on protruding portion 1A of metal foil 1 and on end surface of porous body 2 at protruding portion 1A. Dielectric layer 3 is applied on a surface of porous body 2, solid electrolyte layer 4 is applied on a surface of dielectric layer 3, and carbon layer 5 and silver paste layer 6 are provided on solid electrolyte layer 4 to serve as a collector layer. The above is a configuration of a capacitor element. The capacitor element is then resin-packaged to form outer package 7, which has external terminal 8 electrically connected to protruding portion 1A of metal foil 1 and external terminal 9 electrically connected to silver paste layer 6.

Next, a manufacturing method of the solid electrolytic capacitor is described specifically with reference to FIGS. 2A to 2F.

Sheet-shaped sintered porous body 2 (3.4×5.3×0.2 mm) of tantalum powder is formed on a surface of metal foil 1 made of tantalum or the like. Silicone rubber of viscosity of 33 Pa·s, which cures by moisture, is coated 1 mm thick using a dispenser and then allowed to stand for one hour for drying to form insulating protective layer 10 on protruding portion 1A of metal foil 1 and on end surface of porous body 2 at protruding portion 1A. Next, anodization (12 V) of tantalum in phosphoric acid solution forms dielectric layer 3, a tantalum oxide coating, on surface of porous body 2. Then, the capacitor element is immersed in a pyrrole solution whose weight ratio of pyrrole to water and ethylene glycol is 1:15:1. Additionally, the capacitor element is immersed in an oxidizing solution whose weight ratio of ferric sulfate to water and ethylene glycol is 1:1.5:1.8 to form a polypyrrole coating by chemical reaction of oxidative polymerization. Additionally, the capacitor element is immersed in an thiophene solution whose weight ratio of thiophene to Iron (III) p-toluenesulfonate and butanol is 1:0.1:0.2 to form solid electrolyte layer 4. The surface of insulating protective layer 10 is free from solid electrolyte formation because insulating protective layer 10 composed of silicone rubber is water repellent. Carbon layer 5 and silver paste layer 6 are formed on solid electrolyte layer 4 in succession to perform as a collector layer jointly. After pulling out a contact from the collector layer, the capacitor is packaged into resin mold, composed of epoxy resin or the like, to form outer package 7. External terminal 8 electrically connected to protruding portion 1A is formed at the first end of outer package 7 and another external terminal 9 electrically connected to silver paste layer 6 is formed at the second end of outer package 7 to complete a solid electrolytic capacitor.

As mentioned above, this manufacturing method provides a simplified process suitable for mass production system, as insulating protective layer 10 is formed before anodization, and restoration treatment before polymerization is not needed. In addition, laser processing is not needed to clear undesired solid electrolyte erroneously formed on insulating protective layer 10. The capacitor has lesser leakage current, as the element is free from stresses caused by removing treatment. Additionally, the manufacturing method has a high workability and productivity as silicone rubber is coated by a dispenser. And the method needs no additional process for curing as silicone rubber cures by itself by moisture.

Flexible rubber material forming insulating protective layer 10 fits a rough surface, which has a high adhesiveness and contributes to provide a strong withstand voltage.

(Exemplary Embodiment 2)

Figure 3:
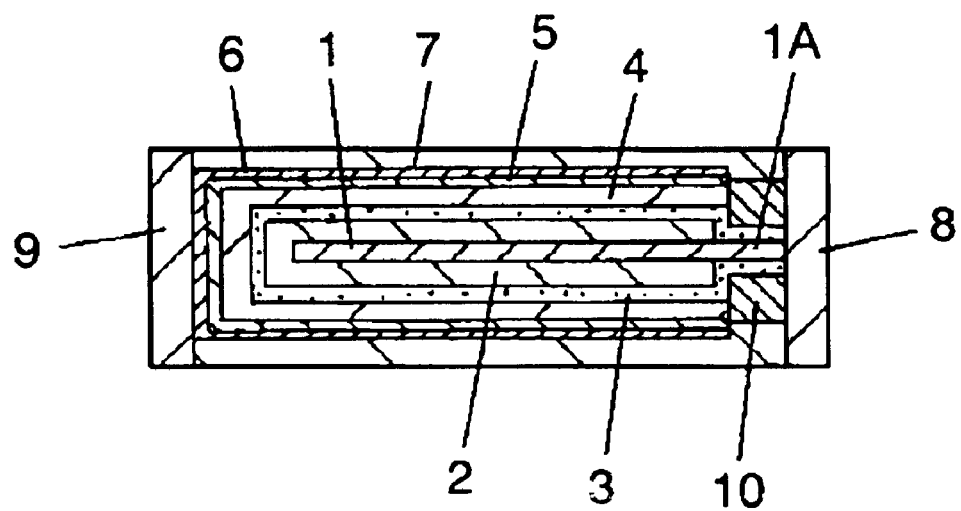
FIG. 3 illustrates a cross-sectional view showing a solid electrolytic capacitor according to exemplary embodiment 2 of the present invention.
Figure 4A:
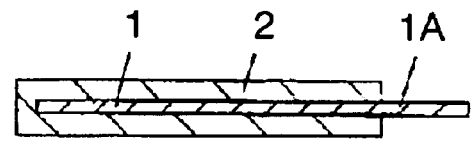
FIGS. 4A to 4F illustrate schematic views showing manufacturing processes of the solid electrolytic capacitor according to exemplary embodiment 2 of the present invention.
Figure 4B:
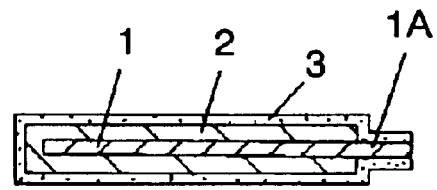
Figure 4C:
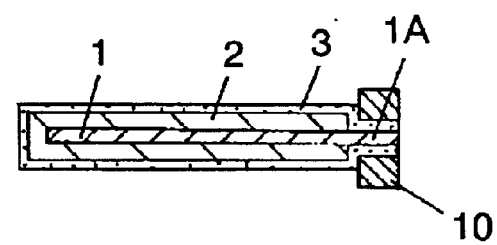
Figure 4D:
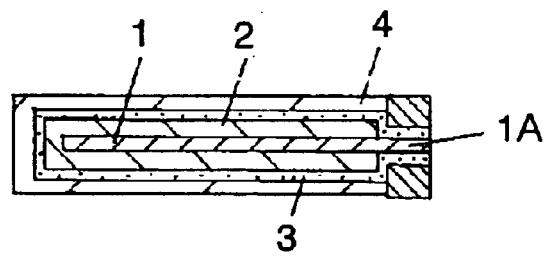
Figure 4E:
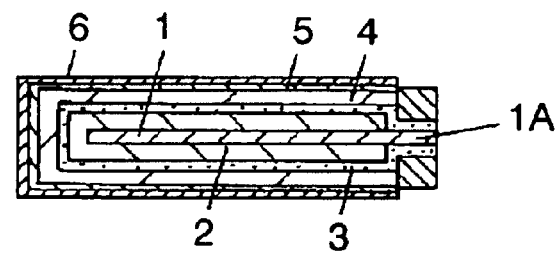
Figure 4F:
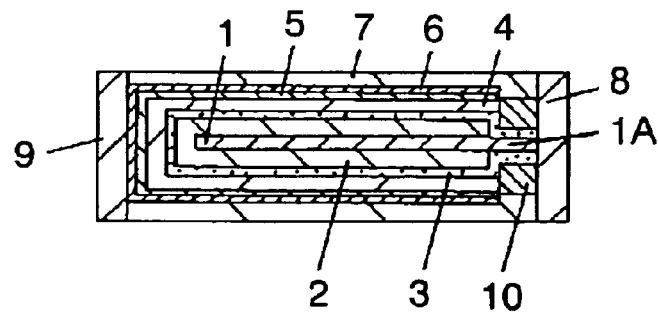

Now, a configuration of the solid electrolytic capacitor used in exemplary embodiment2 is described with reference to FIG. 3

Porous valve metal body 2 is provided on valve metal foil 1, and dielectric layer 3 is formed on surface of porous body 2. Insulating protective layer 10 composed of silicone rubber that cures by moisture or heat energy is provided on surface of dielectric layer 3 covering protruding portion 1A. Solid electrolyte layer 4 is provided on dielectric layer 3, and carbon layer 5 and silver paste layer 6 are provided on solid electrolyte layer 4 to serve as a collector layer. The above is a configuration of the capacitor element. The capacitor element is then resin-packaged to form outer package 7 that has external terminal 8 electrically connected to protruding portion 1A of metal foil 1 and external terminal 9 electrically connected to silver paste layer 6.

Next, a manufacturing method of the solid electrolytic capacitor is described specifically with reference to FIGS. 4A to 4F.

Materials for metal foil 1 or porous body 2, and the manufacturing process of forming porous body 2 on metal foil 1 are the same as described in exemplary embodiment 1. Next, dielectric layer 3, a tantalum oxide coating, is formed on surfaces of metal foil 1 and porous body 2 by the same way as described in exemplary embodiment 1. Silicone rubber that cures by moisture is coated on a portion of dielectric layer 3 covering protruding portion 1A, and then insulating protective layer 10 is provided. Even if dielectric layer 3 does not cover whole surface of protruding portion 1A, silicone rubber should cover the whole surface of protruding portion 1A including the exposed area from dielectric layer 3. Silicone rubber of viscosity of 33 Pa·s is coated 1 mm thick using a dispenser and then allowed to stand for one hour. The capacitor elements are then immersed in phosphoric acid solution for restoration treatment using 12 V, the same voltage as anodization. Next, the capacitor elements are again immersed in an thiophene solution composed of thiophene, Iron (III) p-toluenesulfonate and butanol to form a pre-coat layer. Next, the capacitor elements are immersed in a solution composed of thiophene, alkyl-naphthalenesulfonic acid and isopropanol for electrolytic polymerization to form solid electrolyte layer 4. In this process, a constant voltage of 3 V is supplied between pre-coat layer and a stainless plate is used as an counter electrode in the form of stainless wire, an acting electrode, in touch with pre-coat layer for 30 min for the electrolytic polymerization. Subsequently, the same method as described in exemplary embodiment 1 completes the solid electrolytic capacitor.

(Exemplary Embodiment 3)

Instead of silicone rubber of viscosity of 1 Pa·s used in exemplary embodiment 2, a silicone rubber of viscosity of 2.5 Pa·s is coated and then allowed to stand for one hour for curing in 150° C. to form insulating protective layer 10 for a capacitor element. Next, solid electrolyte layer 4 is formed in the same way as described in exemplary embodiment 2 to complete a solid electrolytic capacitor. A silicone rubber employed in this exemplary embodiment 3 forms insulating protective layer 10 by heat curing. Though additional heating apparatus are needed, maintenance work of coating equipment such as for dispensers in this method is easier, because the silicone rubber does not cure during coating process, which differs from silicone rubber described in exemplary embodiment 1 and 2, which cures by moisture. Some silicone rubber cures by UV radiation, but heating apparatus is much simpler and easier way than UV radiation equipment.

(Example for Comparison)

Figure 6:
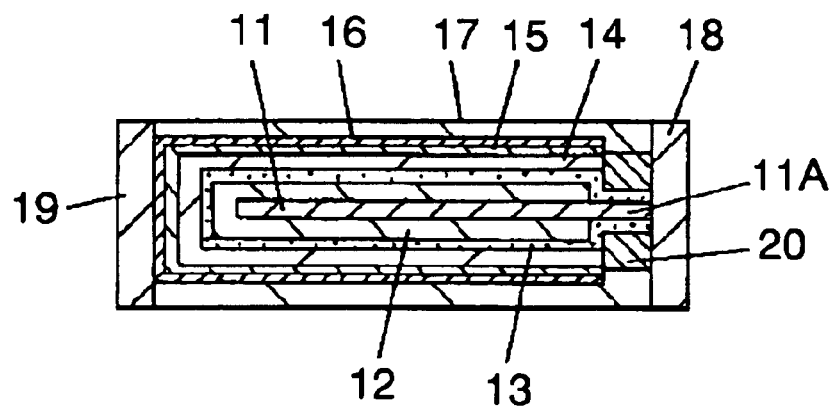
FIG. 6 illustrates a cross-sectional view showing a conventional solid electrolytic capacitor.

In a configuration of a solid electrolytic capacitor used in exemplary embodiment 2, silicone resin instead of silicone rubber is coated and cured for one hour under 150° C. to form insulating protective layer 20. Then, solid electrolyte layer 4 is formed in the same way as described in exemplary embodiment 2 to complete a solid electrolytic capacitor. FIG. 6 shows the basic configuration that is already described.

Table 1 shows the characteristics of solid electrolytic capacitors of afore-mentioned exemplary embodiments and conventional example for comparison.

TABLE 1

| Exemplary embodiment | Capacitance (μF) | Leakage current (μA) | ESR (mΩ) | Withstand voltage (V) |
| --- | --- | --- | --- | --- |
| 1 | 130 | 0.75 | 40 | 12 |
| 2 | 120 | 1.2 | 25 | 8 |
| 3 | 125 | 2 | 25 | 8 |
| convention al | 110 | 23.5 | 25 | 6 |

The comparison check for initial characteristics of solid electrolytic capacitors in Table 1 shows larger leakage current and lower withstand voltage of the conventional solid electrolytic capacitor, as a solid electrolyte layer is formed on insulating protective layer 20. Moreover, the example solid electrolytic capacitor does not perform fully and has smaller capacitance, as coated silicone resin permeates dielectric layer 13 to choke pores of porous body. On the other hand, solid electrolytic capacitors disclosed in this invention show little decrease in capacitance. They show smaller deviation in capacitance in a production process, as coated silicone rubber does not permeate porous body 2.

Moreover, they show lower leakage current and higher withstand voltage, as surface of insulating protective layer 10 is free from solid electrolyte formation. They have lower equivalent series resistance (ESR), as functional polymer composes solid electrolyte layer 4.

(Exemplary Embodiment 4)

Figure 5:
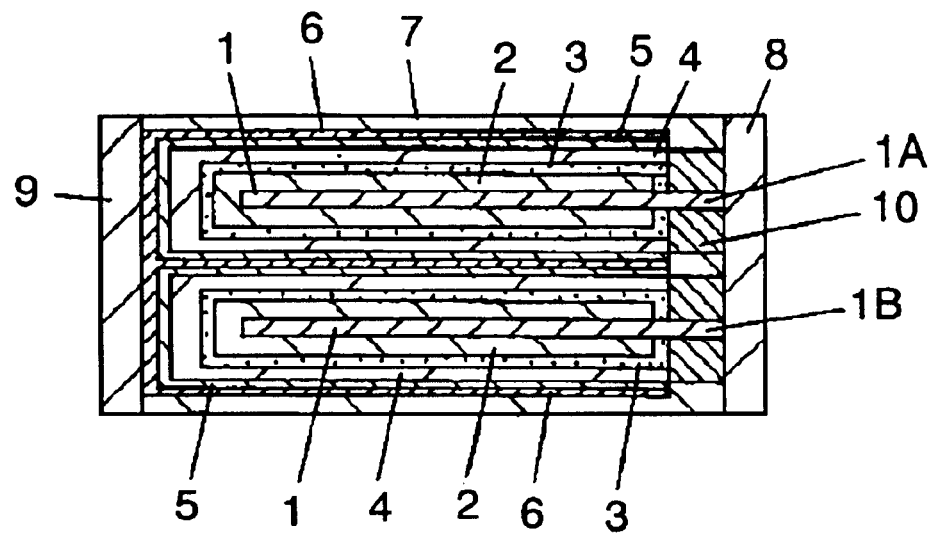
FIG. 5 illustrates a cross-sectional view showing a solid electrolytic capacitor according to exemplary embodiment 4 of the present invention.

FIG. 5 shows a cross-sectional view of a product in which capacitor elements described in exemplary embodiment 1 of this invention are laminated and resin-packaged together to form outer package 7. Such a laminated structure of solid electrolytic capacitor shows low ESR as well as large capacitance.

In the descriptions on all exemplary embodiments of this invention, solid electrolyte layer 4 is formed by chemical polymerization or by electrolytic polymerization using a solid electrolyte layer, formed by chemical polymerization, as a pre-coat layer. Solid electrolyte formed by electrolytic polymerization is not yet specified, but taking into account of easiness of polymerization reaction, polypyrrole, polythiophene or polyaniline or functional polymers that have a derivative of pyrrole, thiophene and aniline as a recurring unit are preferable. And, one of chemically oxidative polymerized polypyrrole, polyaniline and polythiophene by an oxidant, or one of derivative of the above materials are preferable. Moreover, any combination within polypyrrole, polyaniline and polythiophene are agreeable.

Silicone rubber can be prevented from permeating porous body 2 if the silicone rubber has a viscosity of at least 1 Pa·s, or more preferably at least 2.5 Pa·s. The silicone rubber has a viscosity of at most 33 Pa·s in terms of workability in coating process.

Additionally, an example is described in which porous body 2 is formed on surfaces of metal foil 1, but another configuration in which porous body 2 is formed on one surface of metal foil 1 only is also possible.

Industrial Applicability

The invention disclosed can provide a solid electrolytic capacitor having excellent performance characteristics such as no capacitance loss, little leakage current and high withstand voltage due to an insulating protective layer. A silicone rubber that cures by moisture or heat energy is coated to form the insulating protective layer on protruding portion of valve metal foil and on end surface of porous valve metal body just at the protruding portion.

What is claimed is:

1. A solid electrolytic capacitor comprising:
   a capacitor element comprising;
   a valve metal foil having a protruding portion on a first end thereof;
   a porous valve metal body on at least one surface on the valve metal foil;
   an insulating protective layer comprising silicone rubber curable by at least one moisture and heat, and covering said protruding portion of said valve metal foil;
   a dielectric layer on at least a surface of said porous valve metal body;
   a solid electrolyte layer on a surface of said dielectric layer;
   a collector layer on said solid electrolyte layer;
   a first external terminal electrically connected to said protruding portion of said valve metal foil;
   and a second external terminal electrically connected to said collector layer;
   wherein said insulating protective layer directly contacts said protruding portion of said valve metal foil.

2. The solid electrolytic capacitor of claim 1, wherein said dielectric layer covers said protruding portion of said valve metal foil, and said insulating protective layer further covers an area where said dielectric layer covers said protruding portion of valve metal foil.

3. The solid electrolytic capacitor of claim 1, wherein said solid electrolyte layer comprises a polymer.

4. The solid electrolytic capacitor of claim 1, comprising a plurality of said capacitor elements, wherein a plurality of said valve metal foils included in said plurality of capacitor elements are electrically connected together, and a plurality of said collector layers included in said plurality of capacitor elements are electrically connected together.

5. The solid electrolytic capacitor of claim 3, wherein said polymer comprises a derivative of pyrrole, thiophene an aniline as a recurring unit.

6. A manufacturing method of a solid electrolytic capacitor, comprising:
   providing a valve metal foil having a protruding portion on a first end thereof;
   forming a porous valve metal body on at least one surface of the valve metal foil, said at least one surface not including said protruding portion;
   forming an insulating protective layer with silicone rubber that cures by at least one of moisture and heating by coating and covering said protruding portion with the silicone rubber;
   forming a dielectric layer on at least a surface of said porous valve metal body;
   forming a collector layer on a surface of said solid electrolyte layer;
   connecting a first external terminal to said protruding portion of said valve metal foil; and
   connecting a second external terminal to said collector layer;
   wherein forming the insulating protective layer comprises applying the silicone rubber directly on said protruding portion and on an end surface of said porous valve metal body at the protruding portion.

7. The manufacturing method of solid electrolytic capacitor of claim 6, wherein, forming said dielectric layer comprises covering said protruding portion of said valve metal foil with said dielectric layer and
   forming said insulating protective layer comprises coating with silicone rubber an area where said dielectric layer covers said protruding portion.

8. The manufacturing method of solid electrolytic capacitor of claim 6, wherein the viscosity of said silicone rubber is at least 1 Pa·s.

9. The manufacturing method of solid electrolytic capacitor of claim 6, wherein forming said insulating protective layer comprises using a dispenser to coat said protruding portion of said valve metal foil with the silicone rubber.

* * * * *

UNITED STATES PATENT AND TRADEMARK OFFICE
CERTIFICATE OF CORRECTION

PATENT NO. : 6,906,913 B2
DATED : June 14, 2005
INVENTOR(S) : Ayumi Kochi et al.

It is certified that error appears in the above-identified patent and that said Letters Patent is hereby corrected as shown below:

Column 5,
Line 51, change "on the" to -- of said --; and
Line 54, insert -- of -- between "one" and "moisture".
Line 19, replace "an" with -- and --.

Signed and Sealed this

Third Day of January, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,906,913 B2 |
| APPLICATION NO. | : 10/416310 |
| DATED | : June 14, 2005 |
| INVENTOR(S) | : Ayumi Kochi et al. |

Page 1 of 1

It is certified that error appears in the above-identified patent and that said Letters Patent is hereby corrected as shown below:

<u>Column 5,</u>
Line 51, change "on the" to -- of said --; and
Line 54, insert -- of -- between "one" and "moisture".
Column 6, line 20, replace "an" with -- and --.

This certificate supersedes Certificate of Correction issued January 3, 2006.

Signed and Sealed this

Eighteenth Day of September, 2007

JON W. DUDAS
*Director of the United States Patent and Trademark Office*